US010628839B1

(12) United States Patent
Krieger et al.

(10) Patent No.: US 10,628,839 B1
(45) Date of Patent: Apr. 21, 2020

(54) SYSTEM AND METHOD FOR PROVIDING AN ESTIMATE OF PROPERTY VALUE GROWTH BASED ON A REPEAT SALES HOUSE PRICE INDEX

(71) Applicant: Federal Home Loan Mortgage Corporation (Freddie Mac), McLean, VA (US)

(72) Inventors: Stefan Krieger, Oakton, VA (US); J. Douglas Gordon, Arlington, VA (US); Yang Wang, Falls Church, VA (US); Shaojie Chen, McLean, VA (US); Ming Xiong, Great Falls, VA (US)

(73) Assignee: FEDERAL HOME LOAN MORTGAGE CORPORATION (FREDDIE MAC), McLean, VA (US)

( * ) Notice: Subject to any disclaimer, the term of this patent is extended or adjusted under 35 U.S.C. 154(b) by 0 days.

(21) Appl. No.: 13/894,881

(22) Filed: May 15, 2013

Related U.S. Application Data

(63) Continuation of application No. 12/954,143, filed on Nov. 24, 2010, now Pat. No. 8,452,641, which is a
(Continued)

(51) Int. Cl.
*G06Q 30/02* (2012.01)
*G06Q 50/16* (2012.01)

(52) U.S. Cl.
CPC ......... *G06Q 30/0202* (2013.01); *G06Q 50/16* (2013.01)

(58) Field of Classification Search
None
See application file for complete search history.

(56) References Cited

U.S. PATENT DOCUMENTS 5,361,201 A * 11/1994 Jost ................. G06Q 40/00
705/35
5,414,621 A * 5/1995 Hough ............ G06Q 30/0205
705/38
(Continued)

FOREIGN PATENT DOCUMENTS

AU 2005100867 B4 * 7/2006
WO WO-2007024916 A2 * 3/2007 ............. G06Q 40/02

OTHER PUBLICATIONS

Iversion, Edwin S. Jr., Spatially Diaggregated Real Estate Indicies, Jun. 9, 1999.*
(Continued)

*Primary Examiner* — Thomas L Mansfield
*Assistant Examiner* — Derick J Holzmacher
(74) *Attorney, Agent, or Firm* — Finnegan, Henderson, Farabow, Garrett & Dunner LLP

(57) ABSTRACT

Systems, methods, and computer-readable storage media are described for estimating real estate property values based on an adjusted repeat sales model using a regularized estimator. In one exemplary embodiment, a computer-implemented method calculates data for estimating the adjustments from an aggregated level to a first disaggregated level by marking a first transaction to a second transaction using a repeat sales house price index function at the aggregated level. The method also determines, using the calculated data, a regularized estimate of the deviation between the repeat sales house price index at the aggregated level and a repeat sales house price index at the first disaggregated level. The method further calculates the repeat sales house price index at the first disaggregated level based on the determined regularized estimate of the deviation from the aggregated level.

33 Claims, 3 Drawing Sheets

Related U.S. Application Data continuation-in-part of application No. 12/344,761, filed on Dec. 29, 2008, now Pat. No. 8,407,120.

(56) References Cited

U.S. PATENT DOCUMENTS

| | | | |
|---|---|---|---|
| 5,500,793 A * | 3/1996 | Deming, Jr. | G06Q 40/04 705/37 |
| 5,644,726 A | 7/1997 | Oppenheimer | |
| 5,680,305 A * | 10/1997 | Apgar, IV | G06Q 10/0635 705/7.28 |
| 5,857,174 A * | 1/1999 | Dugan | G06Q 30/06 705/313 |
| 6,292,789 B1 * | 9/2001 | Schutzer | G06Q 20/04 705/34 |
| 6,401,070 B1 * | 6/2002 | McManus | G06Q 30/06 705/313 |
| 6,609,109 B1 * | 8/2003 | Bradley | G06Q 40/00 705/35 |
| 6,658,460 B1 * | 12/2003 | Streetman | G06Q 10/063 709/217 |
| 6,708,156 B1 * | 3/2004 | Gonten | G06Q 30/02 705/7.31 |
| 6,842,738 B1 * | 1/2005 | Bradley | G06Q 30/0202 705/1.1 |
| 6,876,955 B1 * | 4/2005 | Fleming | G06Q 30/06 702/181 |
| 7,219,078 B2 * | 5/2007 | Lamont | G06Q 30/0278 705/313 |
| 7,236,985 B2 * | 6/2007 | Brecher | G06Q 30/06 707/736 |
| 7,249,146 B2 * | 7/2007 | Brecher | G06Q 30/06 |
| 7,277,715 B2 | 10/2007 | Starr et al. | |
| 7,469,225 B1 | 12/2008 | Perrucci | |
| 7,509,261 B1 * | 3/2009 | McManus | G06Q 30/0202 705/313 |
| 7,640,209 B1 | 12/2009 | Brooks et al. | |
| 7,765,125 B1 * | 7/2010 | An | G06Q 30/00 705/20 |
| 7,788,186 B1 * | 8/2010 | An et al. | 705/306 |
| 7,822,691 B1 | 10/2010 | Kuo | |
| 7,831,492 B1 * | 11/2010 | An | G06Q 20/201 705/35 |
| 7,983,925 B1 | 7/2011 | Kuo | |
| 8,046,306 B2 | 10/2011 | Stinson | |
| 8,214,275 B1 * | 7/2012 | An | G06Q 20/201 705/20 |
| 8,301,459 B1 * | 10/2012 | McManus | G06Q 30/0202 705/1.1 |
| 8,407,120 B1 * | 3/2013 | Gordon et al. | 705/35 |
| 8,452,641 B1 * | 5/2013 | Krieger | G06Q 50/16 705/7.35 |
| 8,666,755 B1 * | 3/2014 | McManus | G06Q 30/0202 705/1.1 |
| 8,738,388 B1 * | 5/2014 | An | G06Q 50/16 705/1.1 |
| 2002/0087389 A1 | 7/2002 | Sklarz et al. | |
| 2004/0010443 A1 | 1/2004 | May et al. | |
| 2006/0190396 A1 * | 8/2006 | Winterhalder | G06Q 20/10 705/39 |
| 2007/0061228 A1 * | 3/2007 | Hecht | G06Q 40/00 705/35 |
| 2007/0185906 A1 * | 8/2007 | Humphries | G06Q 30/02 |
| 2008/0288312 A1 | 11/2008 | Miles et al. | |
| 2009/0099948 A1 * | 4/2009 | Geltner | G06Q 30/02 705/35 |
| 2009/0271333 A1 | 10/2009 | Payrovi | |
| 2010/0023379 A1 | 1/2010 | Rappaport et al. | |
| 2010/0161498 A1 | 6/2010 | Walker et al. | |
| 2012/0059685 A1 * | 3/2012 | Ericson | G06Q 30/02 705/7.31 |
| 2012/0254061 A1 * | 10/2012 | Liu | G06Q 40/02 705/348 |
| 2016/0292800 A1 * | 10/2016 | Smith | G06Q 30/0206 |

OTHER PUBLICATIONS

Leventis, Andrew, OFHEO Working Papers: Removing Bias from Repeat Transactions House Price Index: A Basic Approach, Feb. 2006.*

Harding, John P., Stuart S. Rosenthal, and C. F. Sirmans. "Depreciation of housing capital, maintenance, and house price inflation: Estimates from a repeat sales model." Journal of urban Economics 61. 2 (2007): 193-217. (Year: 2007).*

Bourassa, Steven C., Martin Hoesli, and Jian Sun. "A simple alternative house price index method." Journal of Housing Economics 15.1 (2006): 80-97. (Year: 2006).*

Grimes, Arthur, and Chris Young. "A Simple Repeat Sales House Price Index: comparative properties under alternative data generation processes." (2010). (Year: 2010).*

Wang, Ferdinand T., and Peter M. Zorn. "Estimating house price growth with repeat sales data: what's the aim of the ganne?."  Journal of Housing Economics 6.2 (1997): 93-118. (Year: 1997).*

Wang, Ferdinand T. et al., Estimating House Price Growth with Repeat Sales Data: What's the Aim of the Game? Journal of Housing Economics, vol. 6, 1997.

Quercia, Roberto G., et al., Spatio-Temporal Measurement of House Price Appreciation in Underserved Areas Fannie Mae Foundation, Journal of Housing Research, vol. 11, No. 2, 2000.

Case, Karl E. et al., Home Price Appreciation in Low and Moderate Income Markets Joint Center for Housing Studies of Harvard, Oct. 7, 2001.

Prasad, Nalini et al., Improving Median Housing Price Indexes through Stratication JRER, vol. 30, Nov. 1, 2008.

Pennington-Cross, Anthony, Aggregation bias and the repeat sales price index a chapter in Real estate indicators and financial stability. vol. 21, 2005.

Rappaport, Jordan, A Guide to Aggregate House Price Measures Kansas City Federal Reserve Bank of Kansas City, Second Quarter 2007.

House price index definition Retrieved from Wikipedia.org Sep. 10, 2012.

Cash-Shiller index definition Retrieved from Wikipedia.org Sep. 10, 2012.

Leventis, Andrew OFHEO Working Papers: Removing Appraisal Bias from Repeat-Transactions House Price index: A Basic Approach, Feb. 2006.

Iversen, Edwin S. Jr., Spatially Disaggregated Real Estate Indices Jun. 9, 1999.

Introduction—The Freddie Mac House Price Index (FMHPI) Date Unknown.

Highlights—Part 2: New Purchase Only Price Indexes: Comments and Statistics First Quarter 2007.

Harding, John P. et al., Depreciation of Housing Capital, Maintenance, and House Price Inflation: Estimates from a Repeat Sales Medel, Jun. 30, 2006.

* cited by examiner

SYSTEM AND METHOD FOR PROVIDING AN ESTIMATE OF PROPERTY VALUE GROWTH BASED ON A REPEAT SALES HOUSE PRICE INDEX

RELATED APPLICATIONS

This is a continuation of application Ser. No. 12/954,143, filed Nov. 24, 2010, which is a continuation-in-part of U.S. Pat. No. 8,407,120, issued Mar. 26, 2013, the contents of which are hereby incorporated herein by reference in their entirety.

TECHNICAL FIELD

The present disclosure generally relates to estimating property values, and more particularly, to providing property value estimates based on a repeat sales model using a regularized estimator.

BACKGROUND

Financial institutions and businesses involved with sales of property have long tried to estimate values of property accurately. Accurate estimation serves many important purposes. For example, financial institutions use property value estimates as one of the key factors in calculating the loan to value (LTV) ratio of a home. The LTV ratio is the ratio of a first mortgage (or the total of all mortgage liens (TLTV)) to the appraised or estimated value of the real property. The LTV ratio is an important calculation used by financial institutions to assess lending risks. For example, as the LTV ratio of a property increases, the likelihood of loan default increases. In addition, when a default does occur, the higher the LTV ratio, the greater the potential financial loss to the financial institution. Moreover, financial institutions may "mark-to-market" their portfolio of outstanding loans to determine the current LTV ratios of the mortgages. Mark-to-market is an accounting methodology used to calculate current LTV ratio of outstanding loans. Accordingly, the accuracy of the estimated value of real estate used to calculate the LTV ratio is critical.

One technique for estimating the value of real estate utilizes a repeat sales index. A repeat sales index may be used to identify housing market conditions and the amount of equity homeowners have gained through house price appreciation. The index itself is a composite of changes in individual home prices within a geographical region, such as a municipality, zip code, county, region, or state. The data used in the repeat sales index may comprise successive selling prices and the sale dates for the same property (e.g., a residential home). By using pricing of the same property, the repeat sales index eliminates the inherent bias in price changes that are not due to the true house price change, but due to external factors such as, for example, consumer trends for bigger houses.

The basic repeat sales index may be improved through the use of data from refinance transactions, in addition to data from purchase transactions, in forming repeat sales indices, thereby increasing the size of the estimation sample and the timeliness of the evaluation sample. Moreover, as disclosed in U.S. Pat. No. 6,401,070, the data used in a repeat sales index may be weighted to provide particular importance to one set of data over another. The content of U.S. Pat. No. 6,401,070 is incorporated herein by reference in its entirety.

There are qualitative differences between house price data derived from purchase transactions and from refinance transactions. Purchase transactions typically involve arms-length agreements in which the incentives of the parties will tend to result in an unbiased sales price, and the information of the three parties (buyer, seller, and appraiser) will tend to result in greater accuracy in ascertaining the value of the property. Refinance transactions, on the other hand, have valuation based solely on an appraisal and consequently are subject to several sources of bias. For example, incentive biases in appraisals arise because appraisers are motivated to arrive at valuations that can make the refinance transaction successful. Selection biases arise because, particularly in a down market, the properties that are eligible for refinance are more likely to be those that have appreciated relative to the market as a whole.

A repeated sales index that factors in such biases to the data is generically referred to as a weighted repeat sales index (WRSI). WRSI also refers to indexes that include refinance transactions as well as property sale transactions, and indexes with and without weights on the transactions. As disclosed in U.S. Pat. No. 6,401,070, the WRSI may be expressed as:

$$\log(P_s/P_t) = I_s - I_t + d_{s2}R_{s2} - d_{t1}Rt1 + \xi \quad (1)$$

Here, the variable $P_t$ is the first transaction price, $P_s$ is the second transaction price, $I_t$ is the log house price index (HPI) value at time t, $R_{t1}$ is equal to one (1) if the first transaction is a refinance and equal to zero (0) otherwise, $R_{s2}$ is equal to one (1) if the second transaction is a refinance and equal to zero (0) otherwise, $d_{t1}$ is a coefficient representing the first transaction refinance (REFI) bias at time t, $d_{s2}$ is coefficient representing the second transaction refinance (REFI) bias at time s, and $\xi$ is the error term. In essence, the refinance bias terms measure the difference in appreciation between purchase and refinance transactions at the two dates. Accordingly, the WRSI model of equation (1) allows for time varying differences between refinance and purchase transactions, thereby improving index accuracy.

As used herein, "aggregated level" refers to a geographic region comprised of more than one smaller geographic regions. For example, a state may be an aggregated level of counties and zip codes. As used herein, "disaggregated level" refers to a geographic region that may be included in an aggregated level. For example, a county and a zip code may be disaggregated levels of a state.

The HPI and REFI values that that are used in the WRSI model may be estimated using an ordinary least square (OLS) regression. However, HPI and REFI index estimation using OLS yields excessively volatile and inaccurate estimates, especially at disaggregated levels.

Accordingly, systems and methods are needed that provide a better estimation of the HPI and REFI values that are used in a home price index model. Systems and methods consistent with the present invention address the difficulties discussed above by providing a regularized, adjusted WRSI that calculates a more accurate estimated value of real estate growth rates at aggregated and disaggregated levels, among other things.

SUMMARY

Consistent with the present invention, as embodied and broadly described herein, systems and methods are disclosed for providing an regularized, adjusted weighted repeat sales index.

In one exemplary embodiment, a method for estimating a weighted repeat sales index using a regularized estimator is disclosed. The method includes calculating data for estimating the adjustments from an aggregated level to a first disaggregated level by marking a first transaction to a second transaction using a repeat sales house price index function at the aggregated level. The method also includes determining, using the calculated data, a regularized estimate of the deviation between the repeat sales house price index at the aggregated level and a repeat sales house price index at the first disaggregated level. The method further includes calculating the repeat sales house price index at the first disaggregated level based on the determined regularized estimate of the deviation from the aggregated level.

In another embodiment, a system for estimating a weighted repeat sales index using a regularized estimator is disclosed. The system includes means for calculating data for estimating the adjustments from an aggregated level to a first disaggregated level by marking a first transaction to a second transaction using a repeat sales house price index function at the aggregated level. The system also includes means for determining, using the calculated data, a regularized estimate of the deviation between the repeat sales house price index at the aggregated level and a repeat sales house price index at the first disaggregated level. The system further includes means for calculating the repeat sales house price index at the first disaggregated level based on the determined regularized estimate of the deviation from the aggregated level. Similarly, a regularized estimated at a $2^{nd}$ level of disaggregation and additional levels of disaggregation beyond the $2^{nd}$ can be calculated.

In yet another embodiment, a computer-readable medium including program instructions for performing, when executed by a processor, a method for estimating a weighted repeat sales index using a regularized estimator is disclosed. The method includes calculating data for estimating the adjustments from an aggregated level to a first disaggregated level by marking a first transaction to a second transaction using a repeat sales house price index function at the aggregated level. The method also includes determining, using the calculated data, a regularized estimate of the deviation between the repeat sales house price index at the aggregated level and a repeat sales house price index at the first disaggregated level. The method further includes calculating the repeat sales house price index at the first disaggregated level based on the determined regularized estimate of the deviation from the aggregated level.

It is to be understood that both the foregoing general description and the following detailed description are exemplary and explanatory only and are not restrictive of the invention, as described. Further features and/or variations may be provided in addition to those set forth herein. For example, embodiments of the present invention may be directed to various combinations and subcombinations of several further features disclosed below in the detailed description.

BRIEF DESCRIPTION OF THE DRAWINGS

The accompanying drawings, which are incorporated in and constitute a part of this specification, illustrate various features, embodiments and aspects consistent with the invention and, together with the description, explain advantages and principles of the invention. In the drawings.

DESCRIPTION OF THE EMBODIMENTS

Reference will now be made in detail to various embodiments of the invention, examples of which are illustrated in the accompanying drawings. Wherever convenient, similar reference numbers will be used throughout the drawings to refer to the same or like parts. The implementations set forth in the following description do not represent all implementations consistent with the claimed invention. Instead, they are merely some examples of systems and methods consistent with the invention.

Systems and methods consistent with principles of the present invention address the limitations and disadvantages of traditional WRSI for estimating house price values. Systems and methods consistent with principles of the present invention estimate real estate property values based on an adjusted repeat sales model.

Figure 1:
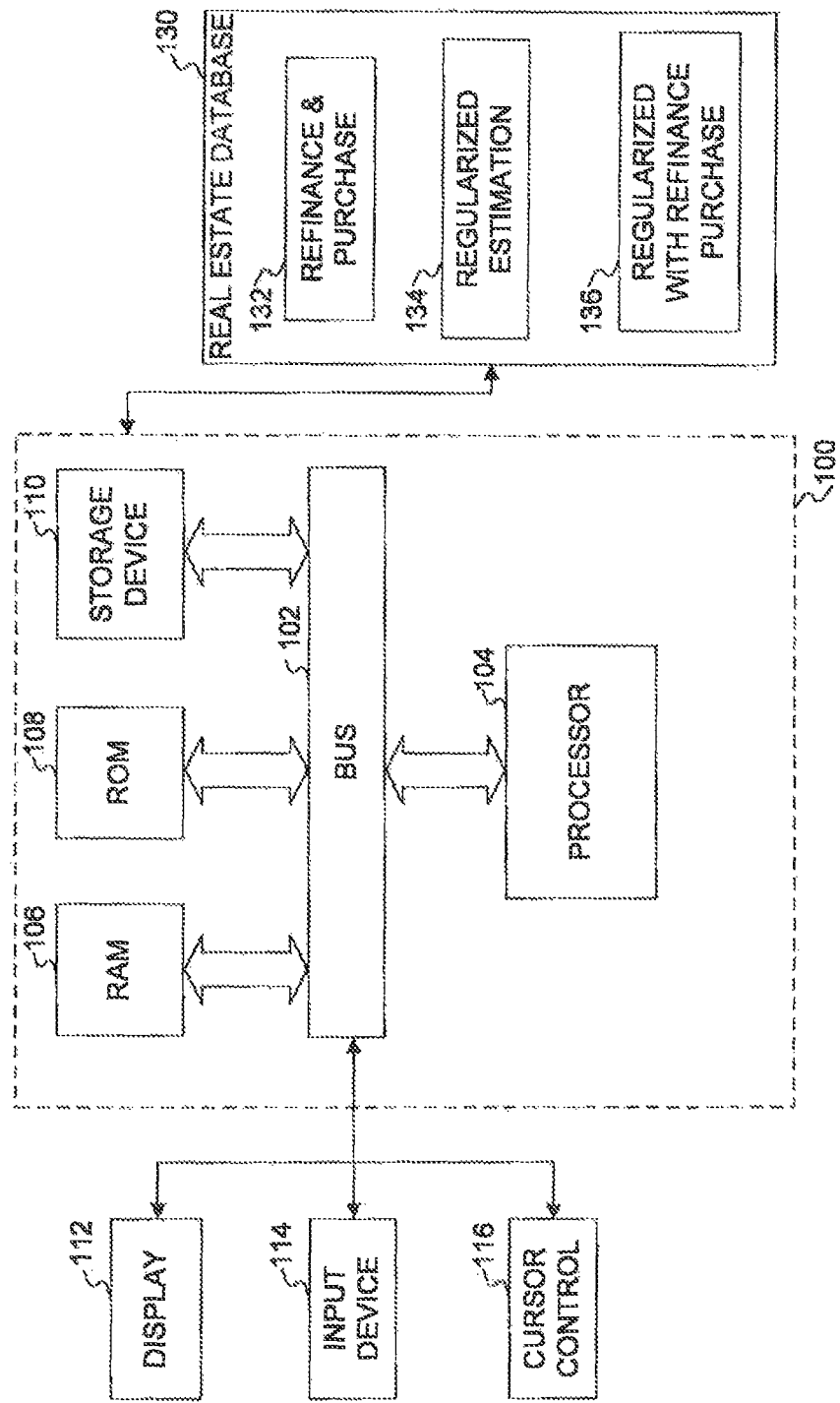
FIG. 1 is a block diagram of an exemplary overview of a property value estimation system, consistent with the principles of the present invention.

FIG. 1 is a block diagram illustrating an exemplary system architecture for a computer system with which embodiments consistent with the present invention may be implemented. In the embodiment shown, computer system 100 includes a bus 102 or other communication mechanism for communicating information, and a processor 104 coupled to bus 102 for processing information. Computer system 100 may also include a main memory, such as a random access memory (RAM) 106 or other dynamic storage device, coupled to bus 102 for storing information and instructions to be executed by processor 104. RAM 106 also may be used to store temporary variables or other intermediate information produced during execution of instructions by processor 104. Computer system 100 may further include a read only memory (ROM) 108 or other static storage device coupled to bus 102 for storing static information and instructions for processor 104. A storage device 110, such as a magnetic disk or optical disk, may also be provided and coupled to bus 102 for storing information and instructions.

Computer system 100 may be coupled via bus 102 to a display 112, such as a thin film transistor liquid crystal display (TFT-LCD), for displaying information to a computer user. An input device 114, such as a keyboard including alphanumeric and other keys, is coupled to bus 102 for communicating information and command selections to processor 104. Another type of user input device is a cursor control 116, such as a mouse, a trackball, or cursor direction keys for communicating direction information and command selections to processor 104 and for controlling cursor movement on display 112.

In the embodiment shown, computer system 100 may access data from real estate database 130 and execute one or more sequences of one or more instructions contained in main memory 106. Both the data from real estate database 130 and the instructions may be read into main memory 106 from another computer-readable medium, such as storage device 110, Data from real estate database 130 may comprise refinance and purchase transaction data 132, regularized estimation data 134, and regularized with refinance and purchase transaction data 136.

The instructions may implement regularized, adjusted WRSI models, as discussed in greater detail below. Execution of the sequences of instructions contained in main memory 106 causes processor 104 to perform operations consistent with the process steps described herein. In one alternative implementation, hardwired circuitry may be used in place of or in combination with real estate database and/or software instructions to implement the invention. Thus implementations of the invention are not limited to any specific combination of hardware circuitry and software.

Computer system 100 may communicate with real estate database 130 through a communication channel comprising, for example, alone or in any suitable combination, a telephony-based network, a local area network (LAN), a wide area network (WAN), a dedicated intranet, wireless LAN, the Internet, and intranet, a wireless network, a bus, or other appropriate communication mechanisms. Moreover, various combinations of wired and/or wireless components may be incorporated into the communication channel. Furthermore, various combinations of point-to-point or network communications may also be incorporated into the communication channel to facilitate communication between the computer system 100 and the real estate database 130. All or some portions of bus 102, for example, may be implemented using such communications mechanisms. Additionally, data communicated through the communication channel may be communicated instead through the transfer of computer-readable media, such as DVDs.

The term "computer-readable medium" as used herein refers to any media that participates in providing instructions to processor 104 for execution. Such a medium may take many forms, including but not limited to, non-volatile media and volatile media. Non-volatile media includes, for example, optical or magnetic disks, such as storage device 110. Volatile media includes dynamic memory, such as main memory 106.

Figure 2:
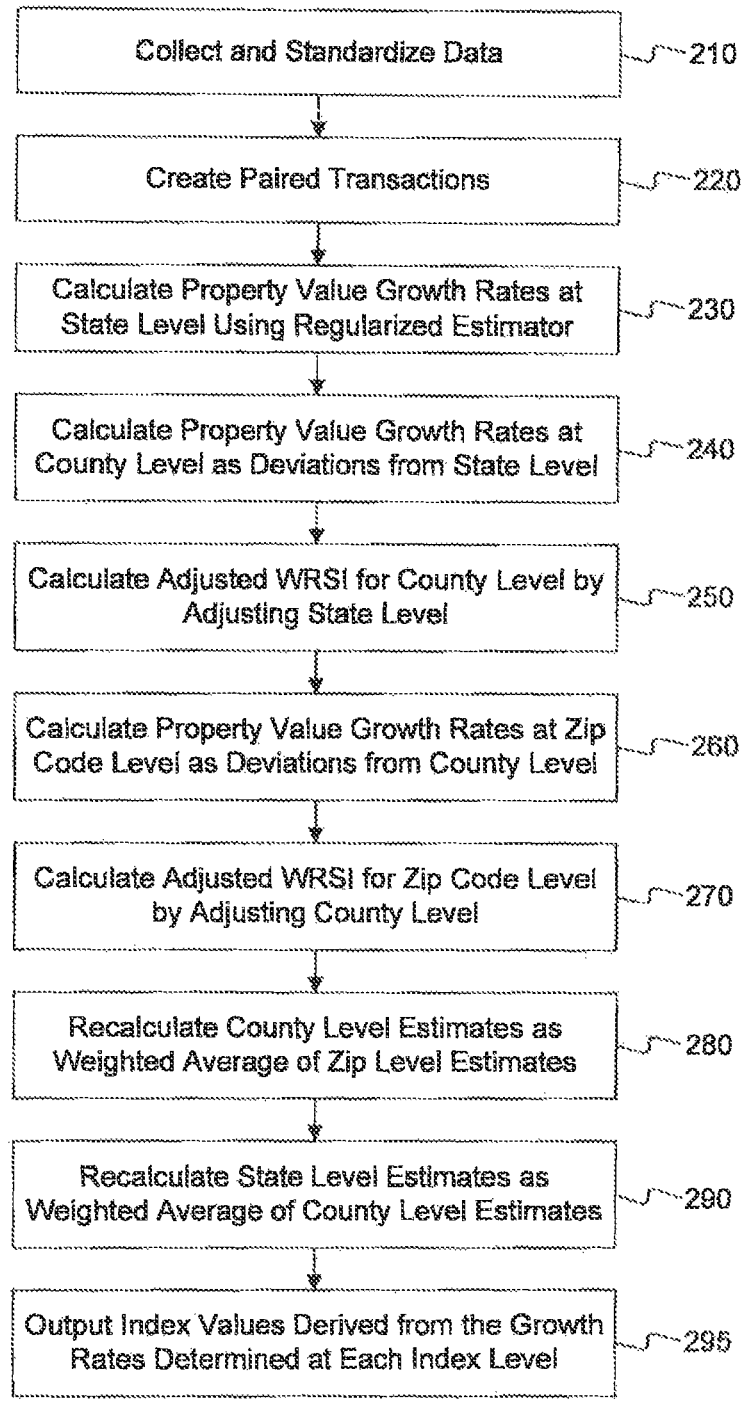
FIG. 2 is an exemplary flowchart for a regularized, adjusted WRSI methodology, consistent with the principles of the present invention.

FIG. 2 is a flowchart for an exemplary method for estimating a weighted repeat sales index, consistent with the present disclosure. Although the method illustrated in FIG. 2 is illustrated as a series of steps, it will be understood by those skilled in the art that non-dependent steps may be performed in a different order than illustrated, or in parallel.

In step 210, data regarding all property transactions during a period of time may be collected and standardized. This data may include houses sold and refinanced. The addresses of the sold and refinanced houses may be standardized by matching the addresses to a U.S. postal standard so that the same house is used. For example, if a house address for a first sale or refinance is listed as 5400 North $22^{nd}$ Street and the same house is listed as 5400 $22^{nd}$ Street North for a second sale or refinance, the U.S. postal standard may standardize the addresses and determine that the two listed addresses are variations of the same address for the same house.

In step 220, data for estimating the adjustments from aggregated to disaggregated levels are created by marking (e.g., pairing) a first real estate transaction to a second real estate transaction using a repeat sales house price index function at an aggregated level, designated by I(t). Step 220 may be skipped when estimating the aggregate level index. The pairs created from marking the first real estate transaction to the second real estate transaction may have equal weights, no weights, or unequal weights. If all pairs created from the first real estate transaction and the second real estate transaction have equal weights, this may be considered equivalent to no weights because there is no variation in the weights. In addition, the estimated index may still be considered weighted even though there may be no associated weights or all weights may be the same.

For discussion of this embodiment, the aggregated level will be the state level. I(t) for the state level may be defined by equation (1) discussed above. Specifically, in one embodiment, I(t) may be calculated using equation (1) in conjunction with regularized estimation techniques applied to refinance and purchase data.

Equation (1) may be rewritten to replace $P_s$ with $p_{i,t2}$, $P_t$ with $p_{i,t1}$, $I_s$ with $HPI_{t2(i)}$, $I_t$ with $HPI_{t1(i)}$, $d_{s2}R_{s2}$ with $refi2_i refiprem2_{t2(i)}$, $d_{s1}R_{s1}$ with $refi1_i refiprem1_{t1(i)}$. Accordingly, equation (1) may be expressed as a model that takes the form of:

$$y_i = \log(p_{i,t2}/p_{i,t1}) = HPI_{t2(i)} - HPI_{t1(i)} + refi2_i refiprem2_{t2(i)} - refi1_i refiprem1_{t1(i)} + \varepsilon_i \quad (2)$$

where $y_i$ is a transaction return, $p_{i,t1}$ is the first transaction price, $p_{i,t2}$ is the second transaction price, $HPI_{t1(i)}$ is the log index value at time $t_1$, $HPI_{t2(i)}$ is the log index value at time $t_2$, $refiprem1_{t1(i)}$ is equal to one (1) if the first transaction is a refinance and equal to zero (0) otherwise, $refiprem2_{t2(i)}$ is equal to one (1) if the second transaction is a refinance and equal to zero (0) otherwise, $refi1_i$ is a coefficient representing the first transaction refinance bias at time $t_1$, $refi2_i$ is coefficient representing the second transaction refinance bias at time $t_2$, and $\varepsilon_i$ is the error term.

Equation (2) may be rewritten by stacking all transaction returns as:

$$y = X\beta + \varepsilon \quad (3)$$

where y is a vector of stacked repeat transaction returns $y_i = \log(p_{i,t2}/p_{i,t1})$. $X = [X1\ X2\ X3]$ is the matrix with the regressors: X1 is a N*(T−1) matrix which in each row i has a −1 in column t1 if the first transaction of repeat transaction i took place at time t1 and a 1 in column t2 if the second transaction of repeat transaction i took place at time t2. The last time period T does not receive a column in matrix X1, which normalizes $HPI_T$ to zero. X2 is a N*T matrix which in each row i has a −1 in column t1 if the first transaction of repeat transaction i has a refi flag. Similarly, X3 is a N*T matrix which in each row i has a 1 in column t2 if the second transaction of repeat transaction i has a refi flag. The coefficient vector $\beta'$ is $[\beta_{HPI}'\beta_{refi1}'\beta_{refi2}']$ where $\beta_{HPI}$ is the HPI vector for t=1 . . . T−1, $\beta_{refi1}$ is the vector of $refi1_i refiprem1_{t1(i)}$, $\beta_{refi2}$ is the vector of $refi2_i refiprem2_{t2(i)}$, and $\varepsilon$ is the vector of pricing error terms.

This regression set-up generalizes to linear splines such as described in U.S. Pat. No. 6,401,070, by modifying the $X = [X1\ X2\ X3]$ matrix along the appropriate lines. Specifically, for monthly knot points for $HPI_t$ on the first of each month, for a date n days into month m, weight ([# days in month m]+1−n)/[# days in month m] may be put on the X columns corresponding to the knot point on the first day of month m and weight (n−1)/[# days in month m] may be put on the knot point on the first day of the next month after month m. This set up allows for a smooth modeling of within month, transaction returns with index values estimated at monthly frequencies. This is a sensible approach given the volatility of index values at, monthly frequencies.

At this time, parameters $HPI_t$, $refiprem1_t$, and $refiprem2_t$ may be estimated using the equation:

$$\min_{(HPI_t, refiprem1_t, refiprem2_t)} \sum_i (y_i - HPI_{t2(i)} + HPI_{t1(i)} + refi2_i refiprem2_{t2(i)} - refi1_i refiprem1_{t1(i)})^2 / \sigma_\varepsilon^2 \quad (4)$$

Equation (4) may be represented in a compact notation such as:

$$\min_\beta \sigma_\varepsilon^{-2}(y - X\beta)'(y - X\beta) \quad (5)$$

where $\beta$ may be estimated using an Ordinary Least Squares (OLS) model as:

$$\hat{\beta}_{OLS} = (X'X)^{-1}X'y. \qquad (6)$$

where the values of X, X', and y are the values from equation (3).

After calculating $\hat{\beta}_{OLS}$ using equation (6), $\hat{\beta}_{OLS}$, in turn, may be used to estimate the values of HPI at time $t_1$ and $t_2$ and the values of refiprem at time $t_1$ and $t_2$. However, the $\hat{\beta}_{OLS}$ value calculated using equation (6) may result in an excess HPI growth volatility that is observed using OLS regressions.

The estimate $\hat{\beta}_{OLS}$ of HPI and refi premia differs from the underlying true HPI and refi premia that give rise to the observed transaction and refi prices because of the repeat transaction return noise $\varepsilon$. Specifically, $$\hat{\beta}_{OLS} - \beta = (X'X)^{-1}X'\varepsilon.$$

The covariance matrix of this estimation error is given by $$\mathrm{var}(\hat{\beta}_{OLS} - \beta) = \sigma_\varepsilon^2 (X'X)^{-1}.$$

Two remarks are appropriate regarding this estimation error in $\hat{\beta}_{OLS}$. First, the estimation error for every month depends on the monthly sample size of the data, and, therefore, sensitively may reflect small sample size problems for high frequency estimation periods and detailed levels of geographical disaggregation. Second, from this expression the variance in the second difference of HPI that is due to sample error may be determined. The second difference of HPI is given by $D^2 S_{HPI}\beta$. Here $S_{HPI}$ may be a matrix that selects the HPI component of $\beta$ (as well as adding a zero for $\mathrm{HPI}_T$) and D may be the matrix that takes the first difference. Accordingly, the size of D depends on context. The variance of the innovation to HPI growth due to sample error is then given by $$\mathrm{var}(\Delta^2 S_{HPI}(\hat{\beta}_{OLS} - \beta)) = \mathrm{var}(D^2 S_{HPI}(\hat{\beta}_{OLS} - \beta))$$
$$= \sigma_\varepsilon^2 D^2 S_{HPI}(X'X)^{-1} S_{HPI}' D^{2\prime}.$$

Some of the estimated change in HPI growth is due to sample error, not changes in the growth of the underlying HPI. There may still be uncorrelated variance in the growth rate estimated HPI that is due to the underlying HPI. Noting the large diagonal elements in $(X'X)^{-1}$ for typical repeat home transactions data sets, the sample noise induced change in estimated HPI growth may be negatively autocorrelated at lag one. Moreover, for high frequency measurement intervals for HPI with small samples, the size of this measurement error induced excess volatility of HPI growth is large relative to the volatility of underlying HPI growth.

The regularized regression approach may greatly reduce these problems by averaging across many months given the underlying noise in individual repeat transaction data and the volatility of changes in the growth of HPI.

The OLS estimate $\hat{\beta}_{OLS} = (X'X)^{-1}X'y$ does not take into account that the second difference of HPI is drawn from $N(0, \sigma_{\Delta HPI}^2)$, nor does it take into account that the first differences of the two refi premia are drawn from $N(0, \sigma_{refi}^2)$.

Accordingly, the value of $\beta$ may be regularized by picking $\hat{\beta}_{reg}$ to minimize the expression:

$$\min_\beta \sigma_\varepsilon^{-2}(y - X\beta)'(y - X\beta) + \sigma_{\Delta HPA}^{-2}(D^2 S_{HPI}\beta)'$$
$$(D^2 S_{HPI}\beta) + \tau_{refi}^{-2}(DS_{refi1}\beta)'(DS_{refi1}\beta) + \sigma_{refi}^{-2}$$
$$(DS_{refi2}\beta)'(DS_{refi2}\beta). \qquad (7)$$

where the first term accounts for the probability of observing $\hat{\beta}_{reg}$ due to the fit to the repeat transactions observations, and the second term accounts for the probability of observing $\hat{\beta}_{reg}$ for the second difference of HPI. The last two terms account for the probability of observing the draws of the two refi premia given the process for the first difference of the refi premia, and D denotes the matrix which computes first differences and the $S_{refi}$ matrices selecting refi1 premia and refi2 premia from $\beta$.

This expression minimizes the sum of squared errors with errors weighted by the inverse of their respective variances. As more repeat transactions observations are added, the sum of squared pricing errors adds more terms, while the sum of squared errors relating to innovations in HPI and the refi premia may always have the same number of terms. Therefore, as more data becomes available, this data becomes more important for fitting the model compared to the importance of minimizing innovations in the HPI and refi premia generating process.

Minimizing expression (7) by writing down the Lagrangian, taking the first order conditions, and rearranging yields:

$$\hat{\beta}_{reg} = (X'X + (\sigma_\varepsilon^2/\sigma_{\Delta HPA}^2) D^{2\prime} S_{HPI}' S_{HPI} D^2 + (\sigma_\varepsilon^2/\sigma_{refi}^2)$$
$$D'S_{refi1}'S_{refi1}D + (\sigma_\varepsilon^2/\sigma_{refi}^2) D'S_{refi2}'S_{refi2}D)^{-1}S'y \text{ or}$$
$$\hat{\beta}_{reg} = Py. \qquad (8)$$

Implementing this estimator may require using estimates or prior beliefs for $\hat{\sigma}_\varepsilon^2, \hat{\sigma}_{\Delta HPI}^2$ and $\hat{\sigma}_{refi}^2$ since these variances are not known. However, $\sigma_\varepsilon^2/\sigma_{\Delta HPA}^2$ and $\sigma_\varepsilon^2/\sigma_{refi}^2$ may be thought of as the above parameters. The regularized estimator $\hat{\beta}_{reg} = Py$ is a linear estimator like the OLS estimator. Unlike the OLS estimator, however, the regularized estimator $\hat{\beta}_{reg}$ optimally trades off fitting HPI to minimize repeat transaction return errors, innovations in the second difference of HPI, and innovations in the level of the two refi premia, given the relative variances of these errors/innovations. With known error variances, the regularized estimator $\hat{\beta}_{reg}$ is a maximum likelihood (MLE) estimator that minimizes the mean squared error (MSE) of the estimated HPI to the underlying HPI.

After determining $\hat{\beta}_{reg}$, which may be viewed as a regularized estimator, $\hat{\beta}_{reg}$ may be used to estimate the values of HPI at time $t_1$ and $t_2$ and the values of refi premia at time $t_1$ and $t_2$. Using equation (8) or (9) above to determine regularized estimator $\hat{\beta}_{reg}$ may reduce excess HPI growth volatility observed with OLS regressions and may improve the fit of the estimated HPI to the underlying HPI.

Accordingly, HPI(t) (hence $\mathrm{HPI}_{t2(i)}$) and $\mathrm{HPI}_{t1(i)}$) and REFI(t) (hence refi2,refiprem2$_{t2(i)}$ and refi1,refiprem1$_{t1(i)}$) may be calculated using regularized estimator $\hat{\beta}_{reg}$. The resulting HPI(t) and REFI(t) may be outputted on display 112 or to storage device 110 of FIG. 1. Using HPI(t) and REFI(t), property value growth I(t) may be calculated at the state, or any aggregated level, using regularized estimator $\hat{\beta}_{reg}$ in step 230.

In step 240 an estimation of the deviation between the aggregated level index, in this example the state level index, and the first disaggregated level index, is determined. For purposes of this example, the first disaggregated level index is the county level. The deviations may be determined using regularized estimators as discussed above. The marked transactions from step 220, along with the aggregated level (e.g. state level) index are the inputs to step 240, When the deviations are estimated in step 240, they are then passed to step 250.

In step 240 a disaggregated (for example, county or zip code) model may be fit to the repeat transaction return residual front the state level model. Unlike the state level model where the HPI is assumed to follow a random walk in first differences and refi premia are assumed to follow a random walk in level the zip code level model assumes that zip code level HPI deviations from state HPI follow a random walk in levels and zip code level deviations in refi premia are given by period by period independent identically distributed (Iid) shocks:

$y_i = \log(p_{i,t2}/p_{i,t1}) = HPF_{t2(i)} - HPF_{t1(i)} + \text{refi2}_i \text{refiprem2}^s_{t2(i)} - \text{refi1}_i \text{refiprem1}^s_{t1(i)} + HPF^z_{t2(i)} - HPF^z_{t1(i)} + \text{refi2}_i \text{refiprem2}^z_{t2(i)} - \text{refi1}_i \text{refiprem1}^z_{t1(i)} + \varepsilon_i.$ $HPF_{t+1} = HPF_t + \eta_{t+i}^{HPIz}.$ $\text{refiprem1}^z_t = \eta_t^{refi1z}$ $\text{refiprem2}^z_t = \eta_t^{refi2z}.$ Here superscript "s" indicates a state level variable and superscript "z" indicates a zip code level variable. State level variables evolve as discussed previously. The second stage zip code level regularized HPI estimator is analogous to the regularized HPI estimator at the state level, except that the regularization penalty functional form is rewritten to take into account the change in the order of differencing in HPI and refi premia.

In step 250, an adjusted WRSI for the first disaggregated level is calculated by adjusting the aggregated level index, using the adjustments calculated in step 240. In this example, an adjusted WRSI for the county level is created by calculating the repeat sales house price index function I(t) for the state by the estimated deviations determined in step 240. The adjusted WRSI model may be expressed as:

$$\ln\left(\frac{P_{i(t+1)}}{\hat{P}_{i(t+1)}}\right) = \sum_{j=1}^{k} \beta_j [\max(0, \text{date}_{i(t+1)} - s_j) - \max(0, \text{date}_{it} - s_j)] + \quad (10)$$

$$\beta_{(k+1)} R_{it} + \beta_{(k+2)} R_{i(t+1)} + \sum_{j=1}^{k} \delta_j \max(0, \text{date}_{it} - s_j) R_{it} +$$

$$\sum_{j=1}^{k} \varphi_j \max(0, \text{date}_{i(t+1)} - s_j) R_{i(t+1)} + e_{it(t+1)}$$

The variable $P_{i(t+1)}$ is the transaction value (i.e., the purchase price or appraised value) of house i (i=1, ..., n) at time t+1 (t=1, ..., T), $\hat{P}_{i(t+1)}$ is the estimated transaction value (i.e., estimated purchase price or estimated appraisal value) of house i (1=1, ..., n) at time t+1 (t=1, ..., T), estimated as the value of house i at time t inflated/deflated to time t+1 according to the state level index, date$_{it}$ is the purchase or refinance date of house i (1=1, ..., n) at time t (t=1, ..., T), $R_{it}$ is the refinance flag (0=purchase, 1=refinance) for transaction of house i (i=1, ..., n) at time t (t=1, ..., T), $S_j$ is the knot point (specified as a date) for the $j^{th}$ variable (j=1, ..., k, where k is the number of quarters between 1975Q1 and current quarter), and $\beta j$, $\beta_{(k+1)}$, $\beta_{(k+2)}$ $\delta j$, $\varphi j$ are the model parameters (j=1, ..., k, where k is the number of quarters between a starting quarter, such as 1975Q1 and a current quarter).

The above-adjusted WRSI model not only calculates an adjusted index of the first disaggregated level using data from that level, but also using data from the aggregated level that contains the first disaggregated level.

In step 260, an estimation of the deviation between the first disaggregated level index, in this example the county level index, and a second disaggregated level index, is determined. For purposes of this example, the second disaggregated level index is the zip code level. The deviations may also be determined using regularized estimators as discussed above. The marked transactions from step 220, along with the first disaggregated (e.g. county level) index are the inputs to step 260. When the deviations are estimated in step 260, they are then passed to step 270.

In step 270, an adjusted WRSI for the second disaggregated level is created by adjusting the first disaggregated level index, using the adjustments calculated in step 260. In this example, an adjusted WRSI for the zip code level is created by calculating the repeat sales house price index function I(t) for the county by the estimated deviations determined in step 260.

After the adjusted WRSI for the second disaggregated level (e.g. zip code level) is calculated, the adjusted WRSI for the first disaggregated level (e.g. county level) may be recalculated as a weighted average of the adjusted WRSI for the second disaggregated level in step 280.

Similarly, after the adjusted WRSI for the first disaggregated level (e.g. county level) is calculated, the adjusted WRSI for the aggregated level (e.g., state level) may be recalculated as a weighted average of the adjusted WRSI for the first disaggregated level in step 290. In addition, any number of disaggregated levels may be calculated, and then re-aggregated index values may also be calculated. For example, if a county contains two zip codes with index values in a particular month that are 100 for zip code 1 and 80 for zip code 2, and the weight is 75% for zip code 1 and 25% for zip code 2, the aggregate index value may be calculated by multiplying the index value and weight for zip code 1 (e.g. 100*0.75=75), multiplying the index value and weight for zip code 2 (e.g. 80*0.25=20), and added the two values (e.g. 75+20=95). The weights may be based on the number of housing units in the geographic area, the number of loans, dollar value of loans in the area, or other weights. The weights may also be arithmetic or multiplicative (e.g. applied in logs).

Upon completion of the adjusted WRSI for each level (e.g. state, county, and zip code levels), the adjusted WRSI for each level may be outputted on display 112 or to storage device 110 of FIG. 1 in step 295.

Figure 3:
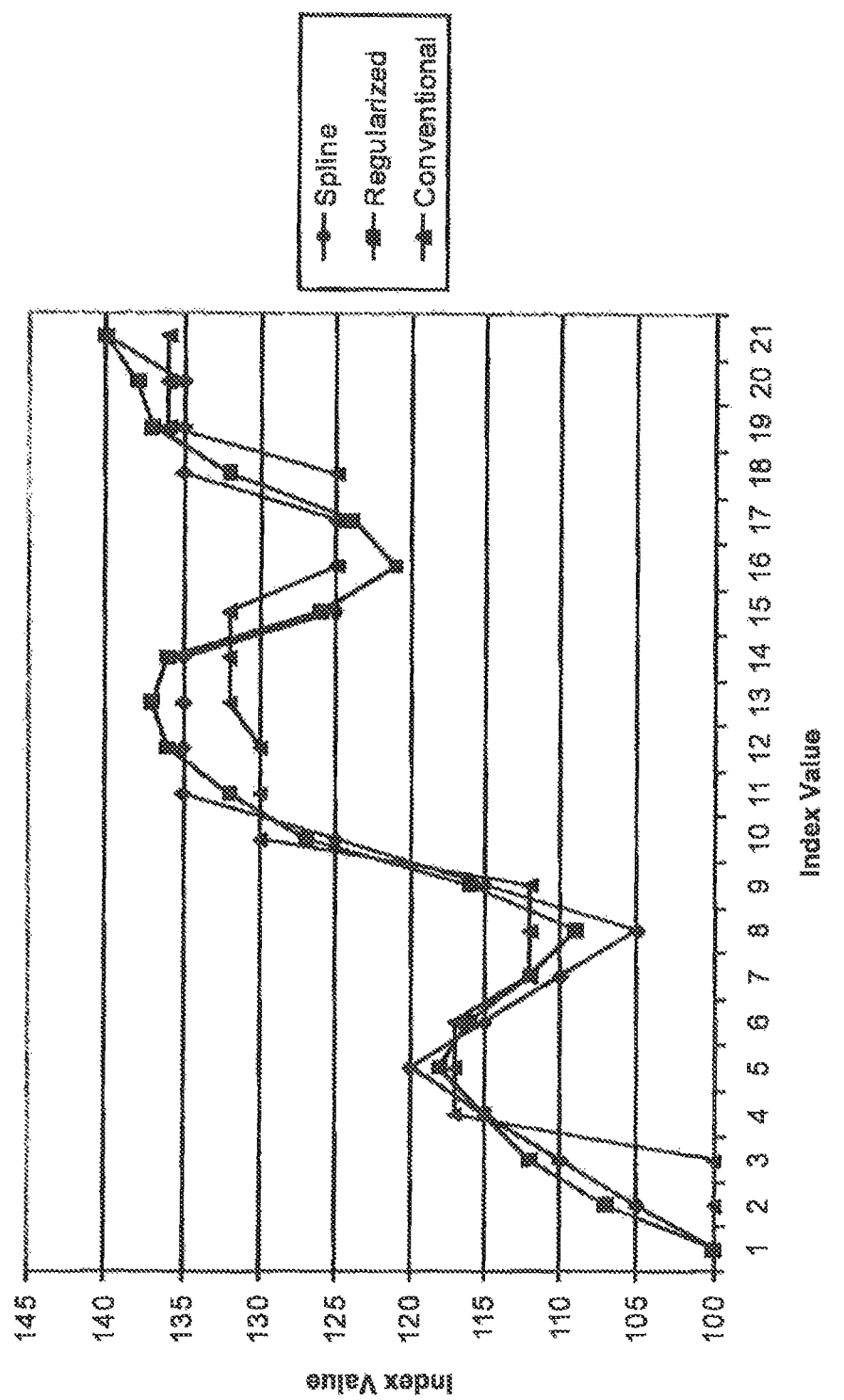
FIG. 3 illustrates examples of plots of conventional, spline, and regularized, adjusted WRSI quarterly house price growth.

FIG. 3 illustrates exemplary plots of a conventional index estimator, a spline index estimator, and the regularized estimator with adjusted WRSI for house price growth at particular levels (e.g. aggregated or disaggregated) during a particular period of time (e.g., quarters). In FIG. 3, twenty one (21) quarters of home price levels, or index values, are plotted. As illustrated, the regularized estimator with adjusted WRSI produces an improved indication of changes in home price values when compared with the conventional index estimator and the spline index estimator.

The foregoing description of possible implementations and embodiments consistent with the present invention does not represent a comprehensive catalog of all such implementations or all variations of the implementations described. The description of only some implementations should not be construed as an intent to exclude other implementations, Other embodiments of the invention will be apparent to those skilled in the art from consideration of the specification and practice of the invention disclosed herein. One of ordinary skill in the art will understand how to implement the invention in the appended claims in other ways using equivalents and alternatives that do not depart from the scope of the following claims. It is intended that the specification and examples be considered as exemplary only, with a true scope and spirit of the invention being indicated by the following claims.

What is claimed is:

1. A computer-implemented method, performed by a processor connected to a communication network, a networked display, and networked real estate databases, the method comprising:

collecting, using the processor accessing the networked real estate databases, data regarding real estate transactions during a period of time, the real estate transactions comprising refinance and purchase transactions of one or more real estate properties within a geographical region, and each real estate transaction comprising an address of a real estate property associated with each real estate transaction, wherein the addresses had been entered in a non-standardized format dependent on how the addresses were listed for the corresponding real estate transactions;

converting, using the processor, addresses of the real estate properties into a standardized format;

pairing, using the processor, a first transaction of a first real estate property completed at a first time point with a second transaction of a second real estate property completed at a second time point based on the standardized addresses, the first real estate property and the second real estate property having a same standardized address, and the first transaction and the second transaction comprising any combination of a refinance transaction and a purchase transaction;

determining, using the processor, value of the first real estate property by:

determining, using the processor, repeat transaction return error, the repeat transaction return error being based on at least one of a value of a repeat sales house price index associated with an aggregated level at the first time point or the second time point, a first transaction price of the first transaction derived from the networked real estate databases, a second transaction price of the second transaction derived from the networked-real estate databases, and a repeat transaction return noise derived from the networked real estate databases, wherein the values of the repeat sales house price index, the first transaction price, the second transaction price, and the repeat transaction return noise are derived from at least one of: data associated with the first transaction and the second transaction, regularized estimation data, or regularized with data associated with the first transaction and the second transaction;

determining, using the processor, an estimate of deviation between the repeat sales house price index associated with the aggregated level and a repeat sales house price index associated with a first disaggregated level, wherein the estimate of deviation is based on one or more repeat transaction returns derived from the networked real estate databases, a probability of the repeat transaction return noise resulting in a change in the repeat sales house price index associated with the aggregated level, and a probability of the repeat transaction return noise resulting in a change in the repeat sales house price index associated with the first disaggregated level;

determining, using the processor, a measure of refinance bias between the first time point and the second time point, wherein the measure of refinance bias is derived from a coefficient representing the first transaction refinance bias at the first time point and a coefficient representing the second transaction refinance bias at the second time point;

determining, using the processor, a measure of property value growth at the first disaggregated level at the first time point or the second time point, wherein the measure of property growth is determined based on optimizing a tradeoff between minimizing the repeat transaction return error, minimizing the estimate of deviation between the repeat sales house price index associated with the aggregated level and a repeat sales house price index associated with a first disaggregated level, and minimizing the measure of refinance bias between the first time-point and the second time point;

redetermining, using the processor, the repeat sales house price index associated with the aggregated level by weighing the measure of property value growth at the first disaggregated level; and determining, using the processor, the value of the first real estate property based on the redetermined repeat sales house price index associated with the aggregated level; and generating, by the processor, a graph plotting changes in the measure of property value growth at the first disaggregated level at the first time point or the second time point and one or more graphs plotting corresponding changes in a measure of property value growth generated based on a conventional index estimator and a spline index estimator, wherein the graph plotting changes in the measure of property value growth at the first disaggregated level is updated based on: changes in the measure of property value growth at the first disaggregated level as a deviation from changes in the measure of property value growth at the aggregated level, and adjustments estimated from the aggregated level to the first disaggregated level by pairing a first real estate transaction to a second real estate transaction using the repeat sales house price index associated with the aggregated level.

2. The computer-implemented method of claim 1, wherein determining the value of the first real estate property further comprises determining a regularized estimator in a linear fashion based on the one or more repeat transaction returns.

3. The computer-implemented method of claim 2, wherein the estimate of deviation is a regularized estimate of deviation.

4. The computer-implemented method of claim 1, wherein determining the value of the first real estate property further comprises calculating a repeat sales house price index associated with the first disaggregated level based on the estimate of deviation.

5. The computer-implemented method of claim 4, wherein determining the value of the first real estate property further comprises calculating a repeat sales house price index associated with a second disaggregated level based on the estimate of the deviation.

6. The computer-implemented method of claim 5 wherein the repeat sales house price index function at the aggregated level, the repeat sales house price index function at the first disaggregated level, and the repeat sales house price index function at the second disaggregated level are weighted to differentiate between purchase transactions and refinance transactions.

7. The computer-implemented method of claim 1, wherein determining the value of the first real estate property further comprises calculating a repeat sales house price index at the first disaggregated level based on a weighted average of a determined regularized estimate of the deviation from a second disaggregated level.

8. The computer-implemented method of claim 7, wherein the second disaggregated level is associated with a geographic region within the United States of America or a zip code area.

9. The computer-implemented method of claim 7, wherein determining the value of the first real estate property further comprises calculating a repeat sales house price index at the aggregated level based on a weighted average of a determined regularized estimate of the deviation from the first disaggregated level.

10. The computer-implemented method of claim 1, wherein the aggregated level is a geographic region within the United States of America or a state.

11. The computer-implemented method of claim 1, wherein the first disaggregated level is a geographic region within the United States of America or a county.

12. A system comprising:
a processor connected to a communication network, a networked display, and a networked real estate databases; and
a memory device containing instructions which, when executed, causes the system to perform a method comprising:
collecting, using the processor accessing the networked real estate databases, data regarding real estate transactions during a period of time, the real estate transactions comprising refinance and purchase transactions of one or more real estate properties within a geographical region, and each real estate transaction comprising an address of a real estate property associated with each real estate transaction, wherein the addresses had been entered in a non-standardized format dependent on how the addresses were listed for the corresponding real estate transactions;
converting, using the processor, addresses of the real estate properties into a standardized format;
pairing, using the processor, a first transaction of a first real estate property completed at a first time point with a second transaction of a second real estate property completed at a second time point based on the standardized addresses, the first real estate property and the second real estate property having a same standardized address, and the first transaction and the second transaction comprising any combination of a refinance transaction and a purchase transaction;
determining, using the processor, value of the first real estate property by:
determining, using the processor, repeat transaction return error, the repeat transaction return error being based on at least one of a value of a repeat sales house price index associated with an aggregated level at the first time point or the second time point, a first transaction price of the first transaction derived from the networked database, a second transaction price of the second transaction derived from the networked real estate databases, and a repeat transaction return noise derived from the networked real estate databases, wherein the value of the repeat sales house price index, the first transaction price, the second transaction price, and the repeat transaction return noise are derived from at least one of: data associated with the first transaction and the second transaction, regularized estimation data, or regularized with data associated with the first transaction and the second transaction;
determining, using the processor, an estimate of deviation between the repeat sales house price index associated with the aggregated level and a repeat sales house price index associated with a first disaggregated level, wherein the estimate of deviation is based on one or more repeat transaction returns derived from the networked real estate databases, a probability of the repeat transaction return noise resulting in a change in the repeat sales house price index associated with the aggregated level, and a probability of the repeat transaction return noise resulting in a change in the repeat sales house price index associated with the first disaggregated level;
determining, using the processor, a measure of refinance bias between the first time point and the second time-point, wherein the measure of refinance bias is derived from a coefficient representing the first transaction refinance bias at the first time point and a coefficient representing the second transaction refinance bias at the second time point;
determining, using the processor, a measure of property value growth at the first disaggregated level at the first time point or the second time point, wherein the measure of property growth is determined based on optimizing a tradeoff between minimizing the repeat transaction return error, minimizing the estimate of deviation between the repeat sales house price index associated with the aggregated level and a repeat sales house price index associated with a first disaggregated level, and minimizing the measure of refinance bias between the first time-point and the second time point;
redetermining, using the processor, the repeat sales house price index associated with the aggregated level by weighing the measure of property value growth at the first disaggregated level; and
determining, using the processor, the value of the first real estate property based on the redetermined repeat sales house price index associated with the aggregated level; and
generating, by the processor, a graph plotting changes in the measure of property value growth at the first disaggregated level at the first time point or the second time point and corresponding changes in a measure of property value growth generated based on a conventional index estimator and a spline index estimator, wherein the graph plotting changes in the measure of property value growth at the first disaggregated level is updated based on: changes in the measure of property value growth at the first disaggregated level as a deviation from changes in the measure of property value growth at the aggregated level, and
adjustments estimated from the aggregated level to the first disaggregated level by pairing a first real estate transaction to a second real estate transaction using the repeat sales house price index associated with the aggregated level.

13. The system of claim 12, wherein determining the value of the first real estate property further comprises determining a regularized estimator in a linear fashion based on the one or more repeat transaction returns.

14. The system of claim 13, wherein the estimate of deviation is a regularized estimate of deviation.

15. The system of claim 12, wherein determining the value of the first real estate property further comprises calculating a repeat sales house price index associated with the first disaggregated level based on the estimate of deviation.

16. The system of claim 15, wherein determining the value of the first real estate property further comprises calculating a repeat sales house price index associated with a second disaggregated level based on the estimate of the deviation.

17. The system of claim 16, wherein the repeat sales house price index function at the aggregated level, the repeat sales house price index function at the first disaggregated level, and the repeat sales house price index function at the second disaggregated level are weighted to differentiate between purchase transactions and refinance transactions.

18. The system of claim 12, wherein determining the value of the first real estate property further comprises calculating a repeat sales house price index at the first disaggregated level based on a weighted average of a determined regularized estimate of the deviation from a second disaggregated level.

19. The system of claim 18, wherein the second disaggregated level is associated with a geographic region within the United States of America or a zip code area.

20. The system of claim 18, wherein determining the value of the first real estate property further comprises calculating a repeat sales house price index at the aggregated level based on a weighted average of a determined regularized estimate of the deviation from the first disaggregated level.

21. The system of claim 12, wherein the aggregated level is a geographic region within the United States of America or a state.

22. The system of claim 12, wherein the first disaggregated level is a geographic region within the United States of America or a county.

23. A non-transitory computer-readable storage medium including program instructions for performing, when executed by a processor connected to a communication network, a networked display, and a networked real estate databases, a method comprising:
  collecting, using the processor accessing the networked real estate databases, data regarding real estate transactions during a period of time, the real estate transactions comprising refinance and purchase transactions of one or more real estate properties within a geographical region, and each real estate transaction comprising an address of a real estate property associated with each real estate transaction, wherein the addresses had been entered in a non-standardized format dependent on how the addresses were listed for the corresponding real estate transactions;
  converting, using the processor, addresses of the real estate properties into a standardized format;
  pairing, using the processor, a first transaction of a first real estate property completed at a first time point with a second transaction of a second real estate property completed at a second time point based on the standardized addresses, the first real estate property and the second real estate property having a same standardized address, and the first transaction and the second transaction comprising any combination of a refinance transaction and a purchase transaction;
  determining, using the processor, value of the first real estate property by:
    determining, using the processor, repeat transaction return error, the repeat transaction return error being based on at least one of a value of a repeat sales house price index associated with an aggregated level at the first time point or the second time point, a first transaction price of the first transaction derived from the networked real estate databases, a second transaction price of the second transaction derived from the networked-real estate databases, and a repeat transaction return noise derived from the networked real estate databases, wherein the value of the repeat sales house price index, the first transaction price, the second transaction price, and the repeat transaction return noise are derived from at least one of: data associated with the first transaction and the second transaction, regularized estimation data, or regularized with data associated with the first transaction and the second transaction;
    determining, using the processor, an estimate of deviation between the repeat sales house price index associated with the aggregated level and a repeat sales house price index associated with a first disaggregated level, wherein the estimate of deviation is based on one or more repeat transaction returns derived from the networked real estate databases, a probability of the repeat transaction return noise resulting in a change in the repeat sales house price index associated with the aggregated level, and a probability of the repeat transaction return noise resulting in a change in the repeat sales house price index associated with the first disaggregated level;
    determining, using the processor, a measure of refinance bias between the first time point and the second time point, wherein the measure of refinance bias is derived from a coefficient representing the first transaction refinance bias at the first time point and a coefficient representing the second transaction refinance bias at the second time point;
    determining, using the processor, a measure of property value growth at the first disaggregated level at the first time point or the second time point, wherein the measure of property growth is determined based on optimizing a tradeoff between minimizing the repeat transaction return error, minimizing the estimate of deviation between the repeat sales house price index associated with the aggregated level and a repeat sales house price index associated with a first disaggregated level, and minimizing the measure of refinance bias between the first time-point and the second time point;
    redetermining, using the processor, the repeat sales house price index associated with the aggregated level by weighing the measure of property value growth at the first disaggregated level; and
    determining, using the processor, the value of the first real estate property based on the redetermined repeat sales house price index associated with the aggregated level; and
  generating, by the processor, a graph plotting changes in the measure of property value growth at the first disaggregated level at the first time point or the second time point and corresponding changes in a measure of property value growth generated based on a conventional index estimator and a spline index estimator, wherein the graph plotting changes in the measure of property value growth at the first disaggregated level is updated based on: changes in the measure of property value growth at the first disaggregated level as a deviation from changes in the measure of property value growth at the aggregated level, and adjustments estimated from the aggregated level to the first disaggregated level by pairing a first real estate transaction to a second real estate transaction using the repeat sales house price index associated with the aggregated level.

24. The non-transitory computer-readable storage medium of claim 23, wherein determining the value of the first real estate property further-comprises determining a regularized estimator in a linear fashion based on the one or more repeat transaction returns.

25. The non-transitory computer-readable storage medium of claim 24, wherein the estimate of deviation is a regularized estimate of deviation.

26. The non-transitory computer-readable storage medium of claim 23, wherein determining the value of the first real estate property further-comprises calculating a repeat sales house price index associated with the first disaggregated level based on the estimate of deviation.

27. The non-transitory computer-readable storage medium of claim 26, wherein determining the value of the first real estate property further-comprises calculating a repeat sales house price index associated with a second disaggregated level based on the estimate of the deviation.

28. The non-transitory computer-readable storage medium of claim 27, wherein the repeat sales house price index function at the aggregated level, the repeat sales house price index function at the first disaggregated level, and the repeat sales house price index function at the second disaggregated level are weighted to differentiate between purchase transactions and refinance transactions.

29. The non-transitory computer-readable storage medium of claim 23, wherein determining the value of the first real estate property further-comprises calculating a repeat sales house price index at the first disaggregated level based on a weighted average of a determined regularized estimate of the deviation from a second disaggregated level.

30. The non-transitory computer-readable storage medium of claim 29, wherein the second disaggregated level is associated with a geographic region within the United States of America or a zip code area.

31. The non-transitory computer-readable storage medium of claim 29, wherein determining the value of the first real estate property further-comprises calculating a repeat sales house price index at the aggregated level based on a weighted average of a determined regularized estimate of the deviation from the first disaggregated level.

32. The non-transitory computer-readable storage medium of claim 23, wherein the aggregated level is a geographic region within the United States of America or a state.

33. The non-transitory computer-readable storage medium of claim 23, wherein the first disaggregated level is a geographic region within the United States of America or a county.

* * * * *

UNITED STATES PATENT AND TRADEMARK OFFICE
CERTIFICATE OF CORRECTION

PATENT NO. : 10,628,839 B1  
APPLICATION NO. : 13/894881  
DATED : April 21, 2020  
INVENTOR(S) : Stefan Krieger et al.

Page 1 of 1

It is certified that error appears in the above-identified patent and that said Letters Patent is hereby corrected as shown below:

In the Claims

Claim 1, Column 11, Line 38, "networked-real estate databases" should read --networked real estate databases--.

Claim 1, Column 12, Line 12, "time-point" should read --time point--.

Claim 12, Column 13, Lines 21-22, "and a networked real estate databases" should read --and networked real estate databases--.

Claim 12, Column 14, Line 21, "time-point" should read --time point--.

Claim 12, Column 14, Line 38, "time-point" should read --time point--.

Claim 23, Column 15, Lines 46-47, "and a networked real estate databases" should read --and networked real estate databases--.

Claim 23, Column 16, Line 13, "the networked-real estate databases" should read --the networked real estate databases--.

Claim 23, Column 16, Line 53, "time-point" should read --time point--.

Claim 24, Column 17, Line 14, "further-comprises" should read --further comprises--.

Claim 26, Column 17, Line 27, "further-comprises" should read --further comprises--.

Claim 29, Column 18, Line 8, "further-comprises" should read --further comprises--.

Claim 31, Column 18, Line 18, "further-comprises" should read --further comprises--.

Signed and Sealed this  
Twelfth Day of April, 2022

Drew Hirshfeld  
*Performing the Functions and Duties of the*  
*Under Secretary of Commerce for Intellectual Property and*  
*Director of the United States Patent and Trademark Office*